INVENTOR.
Charles T. Marshall

Oct. 11, 1960 C. T. MARSHALL 2,955,884
ANTI-FRICTION BEARING UNITS
Filed Oct. 10, 1955 3 Sheets-Sheet 3

INVENTOR.
Charles T. Marshall
BY
ATTORNEY though # United States Patent Office 2,955,884
Patented Oct. 11, 1960

2,955,884

ANTI-FRICTION BEARING UNITS

Charles T. Marshall, Providence, R.I., assignor to Clinton Millman, Oklahoma City, Okla.

Filed Oct. 10, 1955, Ser. No. 539,377

7 Claims. (Cl. 308—190)

This invention relates to an anti-friction bearing unit of both the ball and ball and roller type, and more particularly, but not by way of limitation, to improvements in anti-friction bearings for use in rolling carts, such as grocery and hospital carts, shop trucks, conveyors, skates, lawn mowers, and the like, having rotatable wheel members thereon, and other applications for such bearings.

In the present day type of ball and/or roller bearing units considerable emphasis is placed on such units being pre-lubricated and permanently sealed for their lifetime to overcome the problems inherent in the requirement for periodic lubrication in use. Open or unsealed bearings of these types require periodic lubrication to maintain their efficiency and to attain a reasonable life expectancy, but even with adequate lubrication, such unsealed bearings are subject to infiltration of abrasive foreign matter and corrosive moisture to contaminate and break down lubricants with resultant premature failure. Also periodic lubrication of unsealed bearings in commercial and industrial wheels in use results in lubricants leaking or dripping on floors with unsightly and dangerous results, without consideration to the cost of intermittent lubrication, the added cleaning of wheels and floors, and the cost of accidents from slipping on spilled lubricant. Pre-lubricated sealed bearings overcome these problems by eliminating any substantial loss of lubricant and essentially precluding the entry of foreign matter during the life of the bearing.

Many designs of ball and roller bearing units incorporating seal means have been advanced to maintain lubrication in use and resist the entry of foreign matter. Such constructions have heretofore necessarily been of relatively expensive high precision types incorporating a multiplicity of parts manufactured to very close dimensional tolerances in intricate assemblies, whereas bearings economically practical for such applications as wheels for rolling carts and trucks, including grocery, restaurant and hospital carts and trucks, industrial shop trucks, conveyors, skates, lawn mowers, and the like, have been of comparatively low cost non-precision types to which effective sealing means are not readily, efficiently or dependably adaptable within the economical limitations of their normal markets.

The present invention is generally concerned with an improvement in a ball, or ball and roller type of anti-friction bearing either separately, or in combination with wheels, that is designed to provide the efficiency, dependability and other features of relatively expensive high precision bearings at an economically practical cost comparable to that of non-precision unsealed anti-friction bearings heretofore available for such applications. This invention utilizes a minimum of parts in such a manner as to resist axial thrusts in each of two directions while simultaneously carrying radially directed loads equally between the ball bearings, and further where the lubricant for the bearing unit is maintained constantly without any substantial loss of lubrication, and the entry of foreign matter and other debris is precluded from in and around the bearing surfaces. The structure generally comprises an inner race member cooperating with an outer race member of elastic plastic, or the like, but not limited thereto, and having a plurality of rows of ball bearings disposed conterminous with the ends of the plastic outer race, and which may be modified to include roller members disposed in spaced relation between the two rows of ball bearings. The structure contemplates an assembly of the elements in a manner that is both expeditious and economical. Furthermore, the invention comprehends the combination of an anti-friction bearing where the housing members encircling the one piece race ways is constructed in such a manner to form the hub of the wheel and in some instances, the wheel hub, web and rim as is desired.

It is an important object of this invention to provide an improved ball bearing structure, or combination bearing and wheel structure, having a minimum amount of working parts and designed to resist axial thrusts in each of two directions while carrying radially directed loads equally throughout.

And still another object of this invention is to provide a novelty constructed ball bearing unit with a minimum of parts whereby lubrication is permanently retained in the bearing unit and the entry of foreign matter is essentially precluded therefrom.

And still another object of this invention is to provide an anti-friction bearing assembly which overcomes many of the objectionable features existing in assembling ball bearing and roller parts and to provide a method of assembling said parts in a permanent manner that is simple, easy and economically done, yet maintaining strength and durability of the assembled parts and thereby preclude appreciable distortion of the parts under load or vibration.

And a still additional object of this invention is to provide an anti-friction bearing assembly combined with a wheel structure wherein an element of the bearing unit forms the hub or the hub, web and rim of the wheel.

And still another object of this invention is to provide an anti-friction bearing which is self-lubricated throughout the life thereof, and adequately sealed so as to prevent any substantial leakage of the lubricant from the bearing.

And still another object of this invention is to provide an anti-friction bearing of a plurality of ball bearing races or a plurality of balls and roller races separately, or in combination with wheels, which is simple and inexpensive to assemble and construct, and having excellent strength, rigidity and durability in operation.

Other objects and advantages of the invention will be evident from the following detailed description, read in conjunction with the accompanying drawings, which illustrate my invention.

Figure 3:
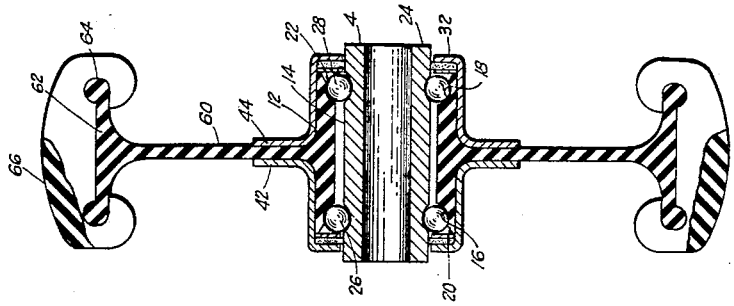
Figure 3 is a similar view showing still another type of wheel application.
Figure 1:
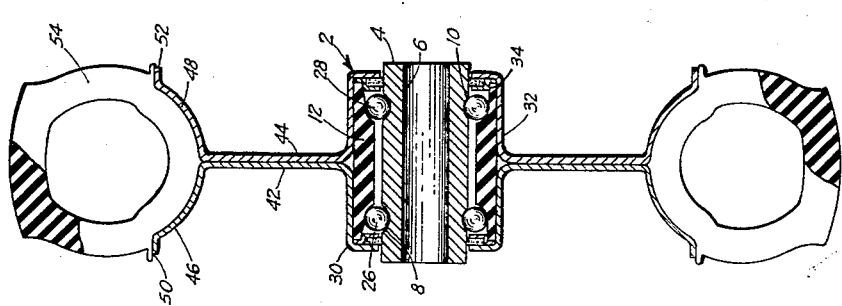
Figure 1 is a sectional elevational view of one embodiment of the bearing unit depicted with one type of wheel application.
Figure 2:
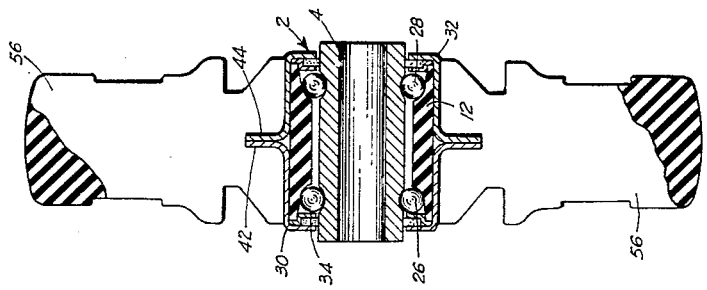
Figure 2 is a similar view showing another type of wheel application.

In the drawings and particularly in Figs. 1 to 3, inclusive, the bearing has been indicated as applied to various types of wheel structure because such application is typical of the combined apparatus with which the invention may be embodied, but it will be apparent that the invention is not limited thereto.

Referring to the drawings in detail, in Figs. 1 to 3, inclusive, reference character 2 indicates the anti-friction bearing unit generally comprising an inner tubular metal member 4 having an aperture 6 therein. The outer periphery of the inner member 4 is provided with a plurality of longitudinally spaced circumferential grooves 8 and 10 adapted to receive a set of ball bearings as will be hereinafter set forth. The apertured member 4 cooperates with an outer race member 12 preferably composed of a comparatively elastic material such as elastic plastic, or the like, but not limited thereto, and is of tubular configuration. The member 12 is provided with an aperture 14, and at opposite ends thereof cooperates with a pair of longitudinally spaced circumferential grooves 16 and 18. As is clearly shown in Fig. 3, the arcuate grooves 16 and 18 communicate with an angled or tapered groove portion 20 and 22 terminating with the opposite end portions of the member 12. The construction of an arcuate groove 16 or 18 cooperating with an angled or flared recess 20 or 22 adjacent one end of the member 12 provides a shoulder portion 24 for a purpose as will be hereinafter set forth.

A plurality of ball bearings 26 and 28 are adapted to be disposed in the grooves 8 and 10 of the member 4, and the balls are held in place by the aligned grooves 16 and 18 of the outer race member 12.

Figure 7:
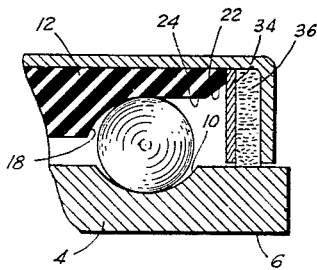
Figure 7 is an enlarged detail view in section of a ball race portion.

It will be apparent that the aperture 6 of the inner member 4 is preferably utilized for disposition of a stationary shaft or axle (not shown) for application with a wheel member of a cart, truck, conveyors, and the like, but not limited thereto. The outer race member 12 in such application is shielded by a pair of cooperating outer housing members 30 and 32 which may be formed to provide the wheel hub and rim as shown in Fig. 1, or only a portion of the wheel rim as shown in Figs. 2 and 3. Prior to sealing the anti-friction unit 2 with the outer housings 30 and 32, the bearing unit is provided with a suitable life-time lubricant and sealed against the entry of debris and foreign matter by disposition of an apertured metal washer 34 of substantially cup shape in cross section as is clearly shown in Fig. 2, or with a flat washer as shown in Figs. 3 and 7. Subsequent placement of a tight fitting washer like member 36 of resilient material, such as natural or synthetic rubber, felt or rubberized felt, adjacent the outer face of the washer 34 provides an efficient, dependable and economical seal for the ball bearings 26 and 28 in the respective race grooves 8 and 16.

After sealing the lubricant in the bearing unit 2, two half portions of metal shields or caps 30 and 32, each having outwardly depending flange portions 42 and 44, are provided for sealing the bearing unit. The halved caps 30 and 32 of suitable dimensions are placed on opposite open ends of the bearing in any suitable manner (not shown) in order to provide a shield for the open ends of the anti-friction bearing unit 2. The caps or housings 30 and 32 are usually of metal, but not limited thereto, and are of comparatively non-elastic material to rigidly confine the elastic material of the outer member 12 over which they are pressed. The two cap halves 30 and 32 have a slight clearance from the inner member 4 and preferably engage at the substantial center of the member 12, but are not limited thereto, and may be even telescoped over one another if desired. Furthermore, it is preferred that the members 30 and 32 be provided with the outstanding flanges 42 and 44, but they may be eliminated if desired. In the use of the flanges 42 and 44 they may be joined together by welding or other suitable means of fastening, thereby assuring an essentially true and concentric wheel and bearing assembly as will be hereinafter set forth. It will be apparent that the metal housings or sleeves confine the outer race member 12 and maintain the comparatively elastic material thereof from expanding radially outwardly to such an extent that the balls 26 and 28 might force themselves out of their groove races under extreme vibration, or load.

In Fig. 1, the cap flanges 42 and 44 are shown formed with a pair of arcuately shaped rim members 46 and 48 having outwardly depending flanges 50 and 52 for receiving a suitable tire member 54. The tire depicted is of the semi-pneumatic type, but not limited thereto.

In Fig. 2 the anti-friction bearing 2 is provided with halved housing sleeves 30 and 32 having the depending flanges 42 and 44 of considerably decreased radial length as shown, and with which a solid type of wheel 56 is molded around or secured thereon in other suitable ways.

In Fig. 3 is shown a slight modification of the housing sleeves 30 and 32 which are spaced slightly apart for bearing against a radially extending integral flange portion 60 of the plastic outer member 12. The flange 60 acts as a wheel hub provided with an outwardly depending flange member 62 having oppositely disposed ear members 64 acting as a wheel rim for the reception of the wheel tire 68 in any suitable manner.

Figure 4:
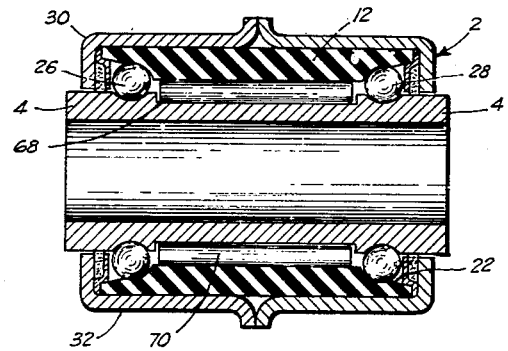
Figure 4 is a sectional elevational view of a slightly modified form of the bearing showing use of rollers.

In Fig. 4 is shown a slight modification of the bearing 2 wherein the outer periphery of the inner member 4 is provided with a circumferential groove 68 adapted to receive a plurality of roller members 70 disposed between the ball bearings 26 and 28.

It will thus be seen that the anti-friction bearing 2 as shown in Figs. 1 to 3 provides a double ball bearing race in which the one piece inner race member 4 is provided with spaced grooves, and cooperates with a one piece outer race member having aligned and cooperating grooves therein. The double row ball bearing unit is thus constructed and arranged to resist axial thrusts in either of two directions while simultaneously carrying the radially directed loads equally throughout the bearing unit.

The bearing unit 2 shown in Fig. 4 provides substantially the same construction utilizing only a minimum of parts, but in addition to the double row of ball bearing races, includes a roller race or roller races 70 between the two outer ball bearing races, and includes all the advantages of the bearing unit having only ball bearing races. The combined ball bearing race unit shown in Figs. 1 to 3 is preferably used in applications of lighter duty wheeled carts, trucks, or conveyors, while the combined ball bearing and roller race unit of Fig. 4 may be utilized for somewhat heavier duty applications.

It will be apparent that the anti-friction bearing unit 2 is not limited to applications where the outer housings or cover caps 30 and 32 are necessary, but it may be assembled without the steel caps and utilized in applications such as in water pump or like bearings where the nylon outer member 12 is pressed directly into a metal opening without any necessity of a confining metal cap.

Figure 5:
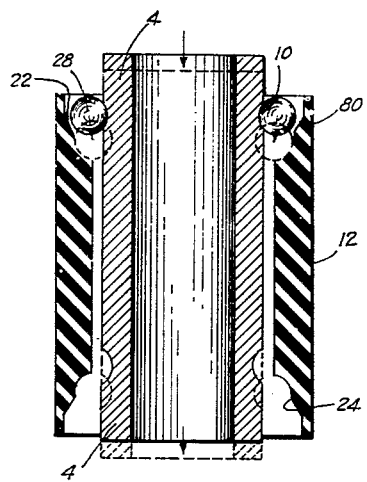
Figure 5 is a sectional elevational view of the unit disposed at right angles to that of Figs. 1 to 3 and showing a method of assembling the balls in the unit.
Figure 6:
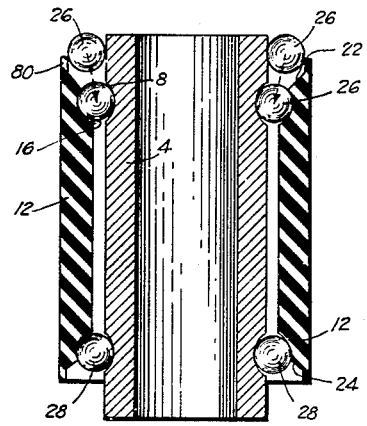
Figure 6 is a view similar to Fig. 5 showing a further step in the assembly.

One of the particular features comprehended by the present structure is the novel method of assembling the anti-friction unit 2 as is clearly shown in Figs. 5 and 6. In assembly the inner race member 4 and its cooperating outer member 12 are placed in a suitable holding jig (not shown) in such a manner that a groove 10 of the member 4 is disposed in substantial alignment with the enlarged or flared portion 22 of the outer member 12, so that upon insertion of the ball bearings 28 therein a peripheral portion of each of the balls may be easily disposed in the groove 10. As soon as all the necessary balls are placed in the recess 22, the outer member 12 is moved longitudinally relative to the member 4, thereby moving the shoulder portion 24 past a media portion of the balls 28 such as shown in dotted lines in Fig. 5, whereupon the elastic member 12 maintains the first row of balls therein. Upon assembly of one row of balls 28, the unit 2 is turned upside down, or one hundred eighty degrees in the jig (not shown) for placement of the opposite row of balls therein as shown in Fig. 6. In this position the groove 16 of the outer member 12, and the groove 8 of the inner member 4 providing the race for the balls 26 are in substantial alignment, consequently as the balls 26 are moved into the flared recess 22 the body portion 80 of the outer member 12 adjacent the recess 22 and 18 is expanded circumferentially so that the balls 26 may be pressed downwardly and snapped into the aligned grooves 8 and 16, respectively, as shown in Fig. 6. As soon as the balls 26 are in position in the grooves 8 and 16, the elastic rim portion 80 contracts back essentially to the original position for maintaining the balls in proper position therein.

The loading of the bearing unit 2 to include the circumferential roller 70 as shown in Fig. 4 is substantially the same as that of Figs. 1 to 3 except that the inner member 4 is first loaded with the roller 70 and is slipped into the outer member 12 followed by a full complement of balls 28 with a subsequent longitudinal movement between the members 4 and 12 to hold the balls 28 prior to an upside down positioning for receiving a full complement of balls 26 as will be hereinafter set forth.

Both of the assemblies, the ball bearing per se or the combination ball and roller assembly are designed so that the radially directed loads are directed between the two rows of balls in one instance or between the two rows of balls and the rollers in the construction in Fig. 4 and in either construction the axial thrusts in either direction are resisted by one row of balls or the other. Furthermore, the loading of the balls in either construction is accomplished without the use of the usual loading notches. After loading of the plurality of rows of balls with or without the circumferential rollers the housing caps 30 and 32 are press fitted around the outer member 12 to complete the antifriction unit 2. Of course, the type of housing sleeves 30 and 32 may vary (Figs. 1 to 3, inclusive) in accordance with the type of cart wheel application or in some instances, may be eliminated entirely as has been heretofore set forth.

It has been found under practical tests that the use of elastic or other plastic material have high expansion coefficients many times that of steel and as a consequence, may be subject to excessive thermal contraction and expansion in relation to the metal parts cooperating therewith. In order to overcome any possible thermal conditions effecting an expansion or contraction causing unusual tolerances, the metal caps 30 and 32 are sized to take advantage of this characteristic of any thermal plastic material in the outer member 12. The inside diameter of the member 12 prior to pressing the caps thereon is usually made a few thousandths larger and the metal caps are then pressed on with a few thousandths, approximately .004 (but not limited thereto) engagement or interference and consequently the inside diameter of the outer race way member 12 will not start to contract circumferentially until the temperature drop has caused a contraction below that of the original press fit interference factor of the metal caps. Inversely, the metal caps 30 and 32 may control expansion from increased temperatures by forcing the semi-elastic material in member 12 to squeeze in upon itself rather than expand circumferentially. It will be apparent that the interference fit between the member 12 and the caps 30 and 32 will circumferentially pre-stress the material of the member 12 whereby the material will be considerably stronger for resisting shock forces, and the like.

Figure 8:
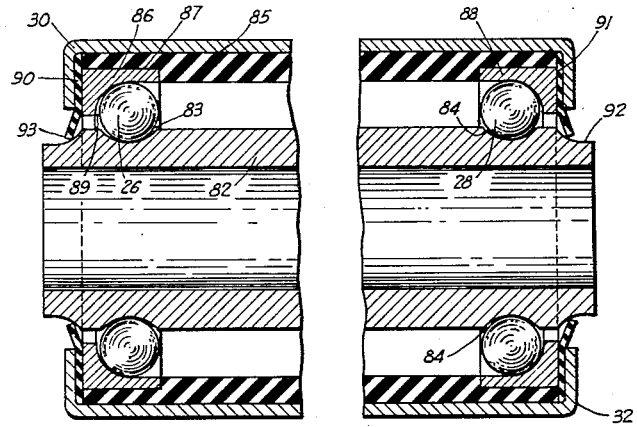
Figure 8 is a broken sectional elevational view showing another modification of the bearing unit.
Figure 9:
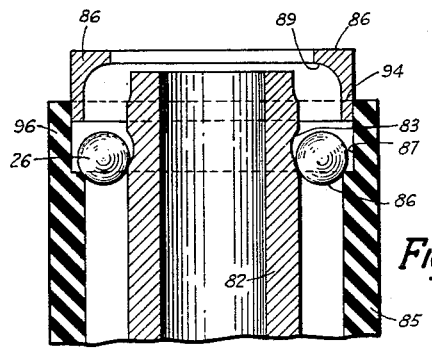
Figure 9 is a broken view in sectional elevation showing a method of assembling the balls for the modified unit of Fig. 8.
Figure 10:
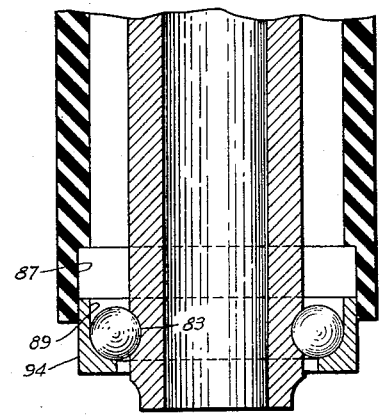
Figure 10 is a view similar to Fig. 9 disposed in reverse position.

In Figs. 8 to 10, inclusive, there is shown another modification of the bearing unit in that there is provided the one piece metal inner member 82 having the usual ball grooves 83 and 84 arranged in longitudinal spaced relation on the outer periphery thereof. An outer sleeve member of elastic material 85 is adapted to telescope over the inner member 82. However, in the preferred embodiment of Figs. 1 to 3, the metal inner member 4 and the elastic outer member 12 are of one piece construction and cooperate as such to maintain the balls in the grooves, whereas in the embodiment shown in Figs. 8 and 10 the elastic member cooperates with metal race ways 86 and 88 for this purpose.

The metal race ways 86 are utilized in heavier duty applications where there is desired a ball bearing unit without rollers and balls in combination as shown in Fig. 4, but where in heavier radial loads application it is desired to use only a ball bearing unit as shown in Figs. 8 to 10.

The outer elastic member 85 has cut away or recessed portions 87 at opposite ends thereof for receiving the circular metal race ways 86 and 88 therein. The inner periphery of the apertured circular race ways are provided with an arcuate grooved portion 89 substantially in conformance with the peripheral contour of the ball bearings 83. It will be apparent that the metal race ways 86 and 88 are pressed fit into the sleeve 85 in a manner as will be hereinafter set forth after inclusion of a permanent lubricant in and around the bearing members followed by a resilient plastic, or the like, washer 90 disposed adjacent the outer face 91 for sealing the lubricant therein. The outer ends of the inner steel member 82 are provided with arcuate or curved recess portions 92 which cooperate with the inner peripheral edge 93 of the apertured rotating resilient washer 90, confined in pressed fit relation between 85 and 86 on the inside, and 30 or 32 on the outside, maintains a seal contact between itself at surface 93, and surface 92 of the metal inner member 85.

In assembling the above structure (Figs. 8 to 10) as clearly shown in Figs. 9 and 10, the outer semi-elastic sleeve 85 is telescoped over the inner sleeve 82 in the position as shown in Fig. 9 and placed in a suitable holding jig (not shown), and the number of balls 26, usually twenty-four (but not limited thereto), are dropped into one of the grooves 83 normally in alignment with the cut away recess 87. The circular sleeve member 86 with its arcuate groove 89 facing downward as shown is then pressed into the cut away recess 87. However, the longer leg portion 94 of the steel race way 86 is prevented from complete disposition in the recess 87 by the outer periphery of the ball 26. As a consequence, the assembly is taken out of the holding jig (not shown) and turned upside down in the manner shown in Fig. 10 permitting the balls to fall into disposition between the angled groove 89 and a ball retaining groove 83 after which the outside elastic member 85 is moved downwardly over the outside face of the race way leg 94 to move the metal race way 86 into the undercut recess portion 87 in a pressed fit relation. In this position the balls 28 are loaded into the grooves 84 and the operation is repeated for inserting the second metal race way sleeve 88 in the undercut portion 87 at the opposite end of the assembly.

With the balls assembled as above set forth and after application of lubricant therein the seal washers of resilient plastic, or the like, are pressed against the assembly following a press fit of the halved housing caps 30 and 32 in the same manner as set forth in the preferred embodiment. Due to the flexibility or elastic characteristics of the outer member 85 and particularly the end portion 96 into which the steel race ways 86 are disposed in a press fit, any radial shocks from heavy loads or excessive vibrations are absorbed by the elastic lip 96 as well as the elastic member 85 which might otherwise dent or crack a conventional bearing unit, such as the balls, the inner race and the race way members.

The modified embodiment as shown in Fig. 8 may be combined with wheel structures wherein the halved housings 30 and 32 form a combination of bearing and wheel unit in the same manner as that shown in the preferred embodiment in Figs. 1 to 3. One of the primary advantages of this invention, in its varied but entirely intrarelated phases and versions, lies in the combination of wheel and bearings, and wheel, bearing and tire, applications wherein parts of each become parts of each other to serve two or more purposes, as illustrated in Figs. 1, 2 and 3. In addition to the manufacturing economies obviously inherent in these combination designs, they assure unusual strength and rigidity for the assemblies, the reduction of accumulated dimensional tolerances, positive alignment between the race ways of the bearings, exceptionally close concentricity between the bearing axis and the wheel periphery, and maintain an unusually close ninety degree axis angularity to the rolling direction. The economical practicality of pre-lubrication and permanent sealing of the structure comes as a by-product of the basic design features which also provide the other advantages.

Figure 11:
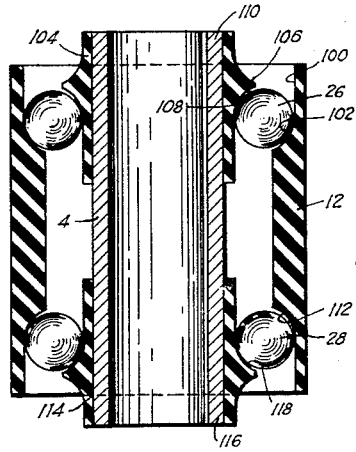
Figure 11 is a sectional elevational view of still another modification of the unit.

In Fig. 11 is shown another modification utilizing a metal inner tubular member 4 and the elastic cylindrical outer member 12 formed of nylon or like material, but not limited thereto. The outer member 12 is provided with a cut away recess 100 having a partial arcuate portion 102 for receiving the metal balls 26. The balls have been referred to as metal balls throughout, but it will be apparent that they are not limited to such and may be made of nylon or other suitable type material if desired. An elastic tubular one piece race member 104 has an outwardly extending flange portion 106 providing an arcuate or curved portion 108 adapted to cooperate with the curved recess 102 for retaining the balls 26 therein as is shown.

In assembly, the tubular one piece nylon race member 104 is pressed over one end of the inner metal member 4 so that the shoulder 106 is disposed above the end 110 of the inner member 4, after which the inner member 4 is placed in a suitable fixture (not shown) and the outer member 12 is then placed over the inner member 4. The disposition of the nylon race 104 relative to the end 110 permits insertion of the balls 26 into the curved recess portion 102 below the shoulder 106 of the race 104. The nylon inner race 104 is then moved downwardly to bring the arcuate portion 108 into circumferential alignment with the arcuate portion 102. It will be apparent that the race 104 could be disposed on the metal member 4 flush with the end 110, and the outer member 12 could be disposed over the inner member slightly further away in order to leave sufficient space for the balls to enter into the grooves 102. With the balls 26 thus disposed in the grooved portions 102 and 104, the anti-friction unit is inverted and replaced in the fixture and the outer member moved longitudinally for alignment of the ball grooves. In such inverted position, a plurality of a lower set of balls 28 are disposed in the groove 112 at the opposite end of the outer member 12, after which a second outer nylon race 114 is press fit onto the opposite end 116 of the metal member 4 to bring the arcuate portion 118 of the nylon race 114 into alignment with the curved groove 112 for maintaining the balls 28 therein. It will be apparent that after assembly of the balls between the inner member 4 and the outer member 12 that the unit may be greased, sealed and housed with suitable seal members, such as 34, 36 and the housing caps 30 and 32 of the preferred embodiment.

It will be apparent that all embodiments of the bearing units have shown a seal unit associated with the unitary bearing structure. However, the unitary bearing structure can be utilized without the seal washer if so desired.

From the foregoing, it will be apparent that the present invention provides a novel anti-friction bearing unit consisting of a minimum number of parts between the race members which provides for an equal distribution of radially directed loads throughout the bearing unit and further, axial thrusts from either direction are resisted by one row of balls or another. The use of a tubular one piece elastic outer member in conjunction with the one piece tubular inner race provides a construction that facilitates the loading of the rows of balls or the rows of balls and the rollers therebetween in a manner that eliminates laborious and time consuming operations, and yet provides a prelubricated and permanently sealed anti-friction bearing unusually strong and rigid that will maintain its high efficiency in operation without maintenance or service costs.

Furthermore, it will be apparent that the present design makes it possible to use the high co-efficients of expansion that is the characteristic of elastic nylon used. Normally using a material having a high co-efficient expansion such as the elastic outer member would be a disadvantage, however, upon confinement and upon being pressed upon itself in the press fit, it can be utilized to every advantage of thermal contraction and expansion.

It will be apparent that the bearing unit has shown a flared or tapered groove portion 20 or 22, but the structure may be modified to include a straight sided groove portion if desired.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a bearing unit adapted for use with a rotatable wheel comprising a tubular one piece inner race member, a one piece outer tubular race member of elastic pre-stressed material movably disposed on the one piece inner member, said race members provided with a pair of longitudinally spaced cooperating grooves normally in alignment with each other, a plurality of balls disposed in the cooperating grooves of the race members, and means housing the race members for maintaining them in unitary relationship, said housing means having a pair of oppositely disposed outwardly extending flanges providing hub, web and rim portions.

2. In an anti-friction bearing unit for use with a wheel comprising an inner one piece tubular race member, an outer one piece tubular race member of elastic circumferentially pre-stressed material movably disposed thereon, cooperating groove means between the race members for receiving a plurality of balls therebetween, a flared recess in correspondence with the groove means on the outer race member to facilitate insertion of the balls in the groove means, said recess adapted to receive a lubricant therein, and seal means disposed in the flared recess to maintain the lubricant permanently therein, and means housing the race members for maintaining them in unitary relationship, said housing means having a pair of oppositely disposed outwardly extending flanges providing hub, web and rim portions.

3. In a bearing unit adapted for use with a rotatable disc wheel comprising a tubular one piece inner race member, an outer tubular one piece race member of elastic pre-stressed material movably disposed on the inner member, said race members provided with a pair of longitudinally spaced cooperating grooves normally in alignment with each other, a plurality of balls disposed in the cooperating grooves of the race members, a flared recess communicating with the grooves on the outer member, said flared recess providing a rim portion capable of flexibility by the elastic material of the outer race member to facilitate loading of the balls in the groove members, means for sealing the flared recess after reception of a lubricant therein, and means housing the cooperating race members for maintaining them in unitary relationship, said housing means having a pair of oppositely disposed outwardly extending flanges providing hub, web and rim portions.

4. The method of assembling an anti-friction bearing unit which consists of forming a pair of longitudinally spaced ball retaining grooves on cooperating inner and outer tubular race members, placing the outer race member of elastic material and having flared recesses at each end over the inner tubular member so that the ball retaining grooves are in mis-alignment longitudinally, inserting balls into a flared recess at one end of the outer member and a ball retaining groove of the inner race positioned opposite thereto, moving the race members longitudinally to align the cooperating ball grooves for holding the balls therein, turning the cooperating race members in an opposite vertical position for the reception of balls in the opposite ball retaining grooves, inserting the balls in the flared recess at an end opposite to that of the first mentioned flared recess, pushing the balls downwardly therein to flex the peripheral rim portion of the elastic outer race member to permit placement of the balls in the cooperating groove members after which the peripheral rim portion automatically contracts for holding the balls therein.

5. A method of assembling an anti-friction ball bearing unit having inner and outer tubular race members adapted to be arranged in telescopic relation wherein said outer member is composed of elastic material which consists of forming a plurality of spaced ball retaining grooves on the cooperating surfaces of the race members, holding the outer race member on the inner race member so that the retaining grooves are in mis-alignment, inserting a plurality of balls into one of the flared recesses provided at each end of the outer member and positioned in alignment with the retaining groove of the inner member, moving said tubular race members to align the cooperating grooves for maintaining the inserted balls therein, reversing the holding position of the race members, inserting a plurality of balls into the flared recess provided at the end of the outer race member opposite to that of the first mentioned flared recess, expanding the body of the elastic outer member adjacent the flared recess to permit placement of the inserted balls into the aligned retaining grooves, housing the assembled race members to maintain them in unitary relationship.

6. In a bearing adapted for use with a rotatable wheel comprising an elongated tubular inner race member, a one piece outer tubular race member of elastic pre-stressed material adapted to be disposed substantially over the one piece inner member, said race members provided with a pair of longitudinally spaced cooperating grooves normally in alignment with each other, a plurality of balls disposed in the cooperating grooves of the race members, and means for confining the outer elastic race member on the inner race member, means for maintaining the race members in a unitary relationship, said last mentioned means having means providing hub, web and rim portions.

7. In an anti-friction bearing unit for use with a wheel comprising an inner tubular race member, an outer tubular race member of elastic circumferentially pre-stressed material movably disposed thereon, an annular groove provided in the opposed ends of the outer race member for facilitating disposition of a plurality of balls between the inner and outer race members, means for retaining a lubricant around the balls, and means for retaining the balls between the races, said last mentioned means having means providing hub, web and rim portions.

References Cited in the file of this patent
UNITED STATES PATENTS

| | | |
|---|---|---|
| 2,137,987 | Smith | Nov. 22, 1938 |
| 2,244,197 | Hessler | June 3, 1941 |
| 2,267,503 | Lytle | Dec. 23, 1941 |
| 2,513,599 | Thomas | July 4, 1950 |
| 2,814,538 | Connolly | Nov. 26, 1957 |

FOREIGN PATENTS

| | | |
|---|---|---|
| 1,092,766 | France | Nov. 10, 1954 |

(Corresponding to British Patent 730,426, May 25, 1955)

OTHER REFERENCES

Product Eng., February 1952, pages 119–123.
Product Engineering, 1953, Annual Handbook, pages C30–C32.